(12) United States Patent
Tomiyasu (10) Patent No.: US 7,174,397 B2
(45) Date of Patent: Feb. 6, 2007

(54) INFORMATION PROCESSING APPARATUS THAT DISPLAYS IMAGE DATA

(75) Inventor: Yuichi Tomiyasu, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 345 days.

(21) Appl. No.: 10/785,996

(22) Filed: Feb. 26, 2004

(65) Prior Publication Data

US 2004/0212607 A1  Oct. 28, 2004

(30) Foreign Application Priority Data

Feb. 28, 2003 (JP) ............... 2003-054679

(51) Int. Cl.
*G06F 13/12* (2006.01)
(52) U.S. Cl. ..................... 710/62
(58) Field of Classification Search ............ 710/62
See application file for complete search history.

(56) References Cited

U.S. PATENT DOCUMENTS

| | | | |
|---|---|---|---|
| 6,297,794 B1 | 10/2001 | Tsubouchi et al. | |
| 6,308,234 B1 * | 10/2001 | Davies et al. | 710/104 |
| 2003/0048258 A1 * | 3/2003 | Numano et al. | 345/172 |

OTHER PUBLICATIONS

Okamoto et al.; "Electronic Apparatus Having Two Systems Each With CPU"; U.S. Appl. No. 10/615,195, filed Jul. 9, 2003.

* cited by examiner

*Primary Examiner*—Kim Huynh
*Assistant Examiner*—Jasjit Vidwan
(74) *Attorney, Agent, or Firm*—Finnegan, Henderson, Farabow, Garrett & Dunner, L.L.P.

(57) ABSTRACT

An information processing apparatus includes a first system and a second system. The first system includes a CPU capable of executing an operating system, a first display controller that causes a display device to display data, a peripheral device having an interface and being capable of outputting image data via the interface, and a first controller that executes communication with the peripheral device via the interface and receives the image data output from the peripheral device. The second system includes a second controller that executes communication with the peripheral device via the interface and receives the image data output from the peripheral device, a second display controller that causes the display device to display the image data, which is received by the second controller, and a switch device that switches a destination of connection of the interface of the peripheral device from the first controller to the second controller.

8 Claims, 6 Drawing Sheets

INFORMATION PROCESSING APPARATUS THAT DISPLAYS IMAGE DATA

CROSS-REFERENCE TO RELATED APPLICATIONS

This application is based upon and claims the benefit of priority from the prior Japanese Patent Application No. 2003-054679, filed Feb. 28, 2003, the entire contents of which are incorporated herein by reference.

BACKGROUND OF THE INVENTION

1. Field of the Invention

The present invention relates generally to an information processing apparatus such as a personal computer, and more particularly to an information processing apparatus capable of displaying image data.

2. Description of the Related Art

In recent years, a variety of notebook or laptop personal computers have been developed. Most of these personal computers have a function of handling image data such as motion video.

U.S. Pat. No. 6,297,794 discloses a computer capable of handling image data. In the system of this computer, motion video data from a video source is transferred to a display controller via a dedicated motion video bus. Thereby, it is possible to prevent the system bus from being occupied by the transfer of motion video data.

In the system of U.S. Pat. No. 6,297,794, however, the display controller connected to the system bus is used to control display of motion video data transferred via the dedicated motion video bus. In usual cases, in an information processing apparatus such as a computer, each system device connected to the system bus becomes operable only after the operating system is activated.

Thus, in the system of U.S. Pat. No. 6,297,794, it is necessary to activate the operating system in advance, in order to display motion video data transferred via the dedicated motion video bus.

BRIEF SUMMARY OF THE INVENTION

According to an embodiment of the present invention, there is provided an information processing apparatus comprising: a first system including a central processing unit (CPU) capable of executing an operating system, a first display controller that causes a display device to display data, which is written in a memory by the CPU, a peripheral device having an interface and being capable of outputting image data via the interface, and a first controller that executes communication with the peripheral device via the interface and receives the image data output from the peripheral device; and a second system operable independently of the first system, the second system including, a second controller that executes communication with the peripheral device via the interface and receives the image data output from the peripheral device, a second display controller that causes the display device to display the image data, which is received by the second controller, and a switch device that switches a destination of connection of the interface of the peripheral device from the first controller to the second controller.

According to another embodiment of the present invention, there is provided an information processing apparatus comprising: a peripheral device configured to be capable of outputting image data; a first system including a central processing unit (CPU) that is capable of executing an operating system; a second system configured to be operable independently of the first system, the second system including a processor that processes the image data output from the peripheral device; a switch device that switches a system, to which the peripheral device is to be connected, between the first system and the second system; and a display control unit connected to the first system and the second system and configured to cause a display device to display data output from at least one of the first system and the second system.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a flow chart showing an example of a process procedure executed when the computer shown in FIG. 1 is powered on;

DETAILED DESCRIPTION OF THE INVENTION

An embodiment of the present invention will now be described with reference to the accompanying drawings. To begin with, referring to FIG. 1 and FIG. 2, the structure of an information processing apparatus according to the embodiment will be described. The information processing apparatus is realized as a notebook-type personal computer by way of example.

Figure 1:
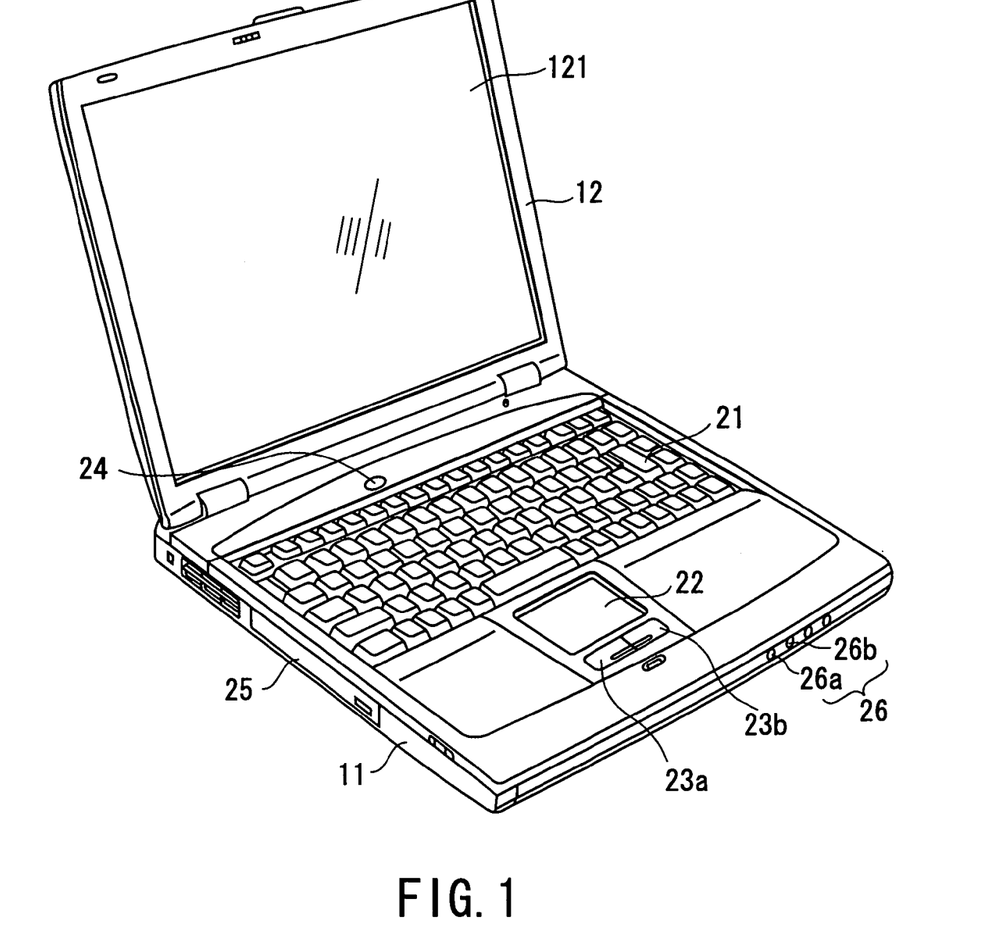
FIG. 1 shows an external appearance of a computer according to an embodiment of the present invention, with the display of the computer being opened.

FIG. 1 is a front view of the notebook-type personal computer in the state in which a display unit thereof is opened. The computer comprises a computer main body 11 and a display unit 12. A display device 121 composed of an LCD (Liquid Crystal Display) is built in the display unit 12. The display unit 12 is attached to be rotatable between an open position and a closed position relative to the computer main body 11. The computer main body 11 has a thin box-shaped housing. A keyboard 21, a touch pad 22, a left button 23a and a right button 23b are disposed on the upper surface of the computer main body 11.

A power button 24 is disposed on a rear part of the upper surface of the computer main body 11. The power button 24 is an operation button for powering on/off the computer. A DVD (Digital Versatile Disk) drive 25 is stored in a drive bay slot is provided on a side surface of the computer main body 11.

Further, video control buttons 26 are provided on a front surface of the computer main body 11. The video control buttons 26 is an operation button group for controlling reproduction operations of image data such as motion video recorded on DVD media driven by the DVD drive 25. The video control buttons 26 include a play button 26a and a stop button 26b. Image data read out of DVD media by the DVD drive 25 is displayed on the LCD 121.

This computer has a video reproduction function of displaying on the LCD 121 the image data recorded on DVD media, without the need to boot the operating system (OS). A user can view image data recorded on DVD media by simply operating the video control buttons 26, without activating the operating system (OS).

Figure 2:
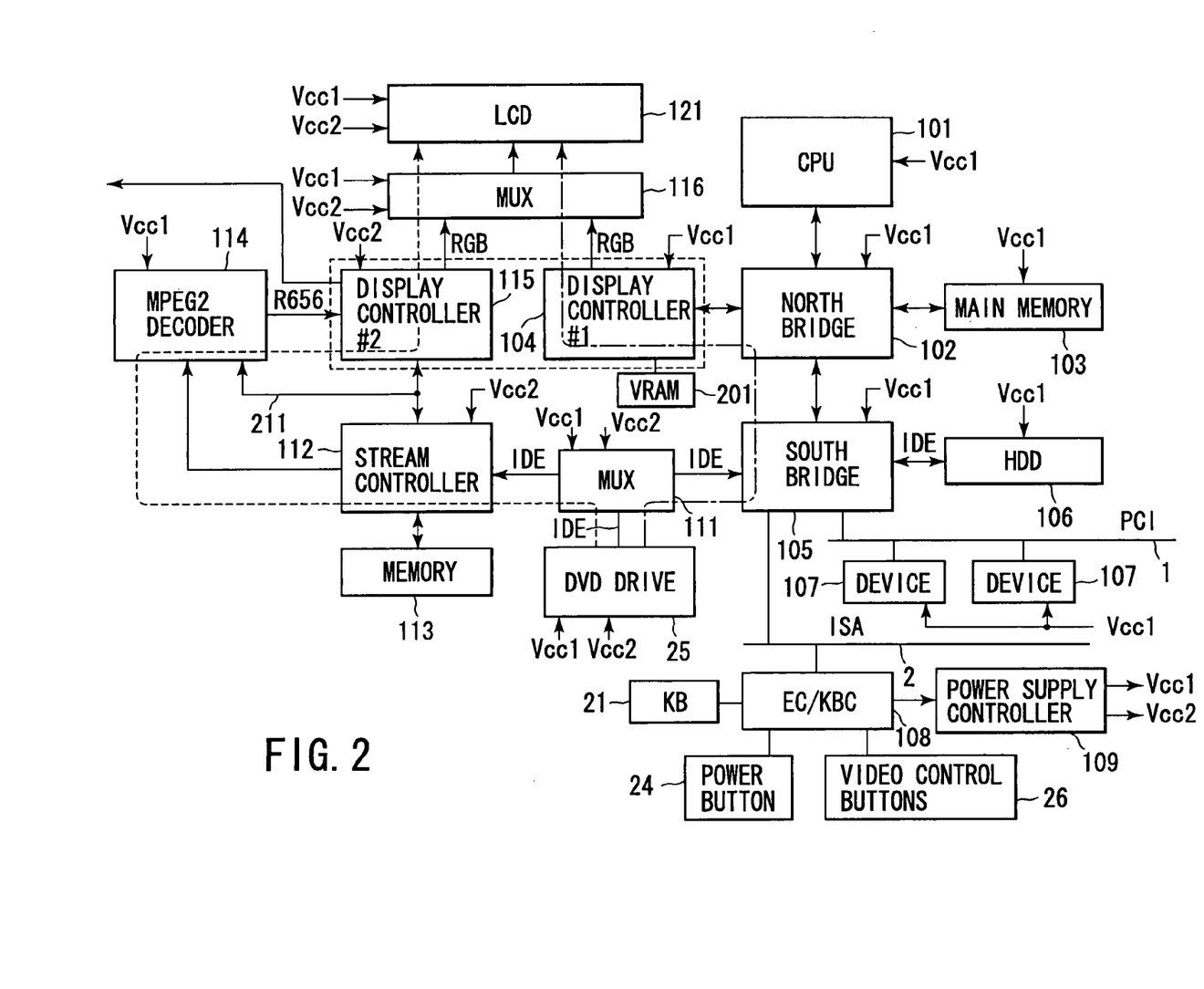
FIG. 2 is a block diagram showing the system configuration of the computer shown in FIG. 1.

FIG. 2 shows the system configuration of the computer.

The computer comprises first and second systems. These two systems operate independently in order to realize the above-described video reproduction function. The first system has the same architecture as an ordinary computer and operates under control of the operating system (OS). On the other hand, the second system is a dedicated system for displaying image data recorded on DVD media. The second system operates independently of the first system. The first and second systems are built in the body 11.

The first system includes a CPU (central processing unit) 101 that executes the operating system (OS). The second system includes a stream controller 112 that is a processor for processing image data recorded on DVD media.

The first system includes a PCI (Peripheral Component Interconnect) bus 1, an ISA (Industry Standard Architecture) bus 2, CPU 101, a north bridge 102, a main memory 103, a first display controller 104, a south bridge 105, a hard disk drive (HDD) 106, a plurality of PCI devices 107, an embedded controller/keyboard controller IC(EC/KBC) 108, a power supply controller 109, and a DVD drive 25.

The CPU 101 is a processor that is provided to control the operation of the computer. The CPU 101 executes an operating system (OS) and an application program, which are loaded in the main memory 103 from the hard disk drive (HDD) 106. The operations of all the components of the first system are controlled by the CPU 101 that executes the OS.

The north bridge 102 is a bridge device that connects a local bus of the CPU 101 and the south bridge 105. The north bridge 102 is provided with a memory controller for controlling the main memory 103, and an AGP (Accelerated Graphics Port) interface for communication with the display controller 104.

The display controller 104 is a graphics controller that controls the LCD 121 used as the display monitor of the computer. The display controller 104 enables the LCD 121 to display data written in a video memory (VRAM) 201 by the CPU 101.

The south bridge 105 is a bridge device for performing communications with various devices on the PCI bus 1 and various devices on the ISA bus 2. The south bridge 105 includes an IDE (Integrated Drive Electronics) controller. In response to an access request from the CPU 101, the south bridge 105 can control the IDE devices (HDD 106, DVD drive 25). Each IDE device has a bus interface for connection to the IDE bus and is connected to the south bridge 105 via the IDE bus. The IDE bus includes a plurality of signal lines that are used for communication between each IDE device and the host thereof. The south bridge 105 functions as the host of the HDD 106 and DVD drive 25.

The embedded controller/keyboard controller IC (EC/KBC) 108 is a single-chip microcomputer in which an embedded controller for power management and a keyboard controller for controlling the keyboard (KB) 21 are integrated.

The embedded controller/keyboard controller IC (EC/KBC) 108 cooperates with the power supply controller 109 and powers on the first system of the computer in response to a power-on signal produced from the power button 24. Specifically, when the power button 24 is operated by the user, the power supply controller 109 generates a power supply VCC1 in response to the power-on signal produced from the power button 24. The power supply VCC1 is a power supply for activating the respective components of the first system.

Responding to supply of the power supply VCC1, the CPU 101 starts a bootstrap process for booting the operating system. In the bootstrap process, the CPU 101 also executes a process for initializing the respective components of the first system.

In addition, the EC/KBC 108 powers on the second system of the computer in response to a reproduction instruction signal that is produced from the play button 26a included in the video control buttons 26. Specifically, when the play button 26a of the video control buttons 26 is operated by the user, the power supply controller 109 generates a power supply VCC2 in response to a reproduction instruction signal produced from the play button 26a. The power supply VCC2 is a power supply for activating the respective components of the second system. When the stop button is operated by the user, the power supply VCC2 is stopped.

The DVD drive 25 is a peripheral device that outputs image data such as motion video. The DVD drive 25 is supplied with both the power supply VCC1 and power supply VCC2 as its operational power supply. Thereby, the DVD drive 25 can operate not only when the computer is powered on, but also when the play button of the video control buttons 26 is operated.

The second system includes a multiplexer (MUX) 111, a stream controller 112, a memory 113, an MPEG2 decoder 114 and a second display controller 115.

The multiplexer (MUX) 111 is a switch device that selectively connects the IDE bus interface of the DVD drive 25 to the south bridge 105 and the stream controller 112. When the play button 26a of video control buttons 26 is operated, the multiplexer (MUX) 111 switches the destination of connection of the IDE bus interface of the DVD drive 25 from the south bridge 105 to the stream controller 112, connecting the DVD drive 25 to the second system.

The multiplexer (MUX) 111 is used to switch the destination of connection of the DVD drive 25 between the first system and the second system. In this sense, the multiplexer (MUX) 111 is regarded as a device independent of the first system and the second system.

The stream controller 112 is a device for controlling the operation of the second system, and it includes a processor. The processor of the stream controller 112 executes a control program stored in the memory 113. The memory 113 includes a nonvolatile memory storing the control program and a DRAM serving as a working memory.

The stream controller 112 is configured to process image data read out of the DVD drive 25. The stream controller 112 transmits operation commands to the MPEG2 decoder 114 and second display controller 115 via a control bus 211, thereby controlling the MPEG2 decoder 114 and second display controller 115. The stream controller 112 includes an IDE controller and is able to control the DVD drive 25 via the IDE bus. Image data read out of the DVD drive 25 is data that is compression-encoded by MPEG2.

The MPEG2 decoder 114 decodes the compression-encoded image data. The data format of the decoded image data output from the MPEG2 decoder 114 is digital YUV (R656). The decoded image data is sent to the second display controller 115.

The second display controller 115 controls the LCD 121 that is used as the display monitor of the computer. The second display controller 115 converts the YUV format of image data output from the MPEG2 decoder 114 to RGB format, and causes the LCD 121 to display the RGB-format image data.

If the number of RGB data input ports provided on the LCD 121 is one, a multiplexer (MUX) 116 needs to be provided in front of the RGB data input port of the LCD 121. The first system and second system basically operate in a mutually exclusive manner. The multiplexer (MUX) 116 delivers RGB data output from either the first display controller 104 or the second display controller 115 to the LCD 121.

The first and second display controllers 104 and 115 may be realized as a single display control unit. Additionally, the function of the multiplexer (MUX) 116 may be incorporated in the display control unit. The display control unit has a port for receiving image data from the first system and a port for receiving image data from the second system. The display control unit causes the LCD 121 to display at least one of image data output from the first system and image data output from the second system.

The stream controller 112, MPEG2 decoder 114 and second display controller 115 are driven by the power supply VCC2. Each of the multiplexers 111 and 116 is supplied with both the power supply VCC1 and power supply VCC2 as its operational power supply.

Next, the path of transfer of image data is described.

The DVD drive 25 is shared by the first and second systems. Either the first system or the second system can cause the LCD 121 to display image data recorded on DVD media.

In the first system, as indicated by a dot-and-dash line in FIG. 2, image data output from the DVD drive 25 is transferred to the first display controller 104 via the multiplexer 111, south bridge 105 and north bridge 102. This transfer operation is executed under control of the CPU 101.

Specifically, the CPU 101 first controls the multiplexer 111 via the south bridge 105, thereby switching the destination of connection of the IDE bus interface of DVD drive 25 to the south bridge 105 side. According to an access request from the CPU 101, the south bridge 105 executes communication with the DVD drive 25 via the IDE bus. Thereby, the south bridge 105 receives image data from the DVD drive 25 via the IDE bus. The image data received by the south bridge 105 is once stored in the main memory 103 and decoded by the CPU 101. Then, the CPU 101 writes the decoded image data into the VRAM 201.

The image data written in the VRAM 201 is displayed on the LCD 121 by the first display controller 104. The CPU 101 can write into the VRAM 201 not only the image data from the DVD drive 25 but also graphics data generated by application programs. Thereby, in the first system, the LCD 121 is enabled to display, for example, a screen image in which image data from the DVD drive 25 is overlaid on graphics data.

In the second system, as indicated by a broken line in FIG. 2, image data output from the DVD drive 25 is transferred to the second display controller 115 via the multiplexer 111, stream controller 112 and MPEG2 decoder 114. This transfer operation is executed under control of the stream controller 112.

Specifically, the stream controller 112 controls the multiplexer 111, thereby switching the destination of connection of the IDE bus interface of DVD drive 25 to the stream controller 112 side. The stream controller 112 executes communication with the DVD drive 25 via the IDE bus. Thereby, the stream controller 112 receives, via the IDE bus, image data output from DVD drive 25. The image data received by the stream controller 112 is decoded by the MPEG2 decoder 114 and transferred to the second display controller 115. The second display controller 115 causes the LCD 121 to display the image data decoded by the MPEG2 decoder 114.

As has been described above, in this computer, the use of the second system makes it possible to cause the LCD 121 to display image data output from the DVD drive 25, without using the buses and devices in the first system. The second system is activated in response to the depression of the play button 26a of video control buttons 26, and the operation of the second system is stopped in response to the depression of the stop button 26b of video control buttons 26. Therefore, the user can view image data such as motion video recorded on DVD media, without the need to power on the computer, that is, without the need to boot the operating system.

Further, the second display controller 115 includes a TV encoder. The TV encoder converts the image data decoded by the MPEG2 decoder 114 to a video signal (e.g. NTSC signal) that is to be output to an external TV receiver. If the video signal output from the computer is supplied to the TV receiver via a cable, the image data such as motion video recorded on DVD media can be displayed on the TV receiver.

The video control buttons 26 are provided on the front surface of the computer main body 11. Thus, the video control buttons 26 can be operated in the state in which the display unit 12 is closed. Therefore, image data recorded on DVD media can be displayed on the TV receiver, without the need to open the display unit 12.

The structure of the multiplexer 111 is described with reference to FIG. 3.

Figure 3:
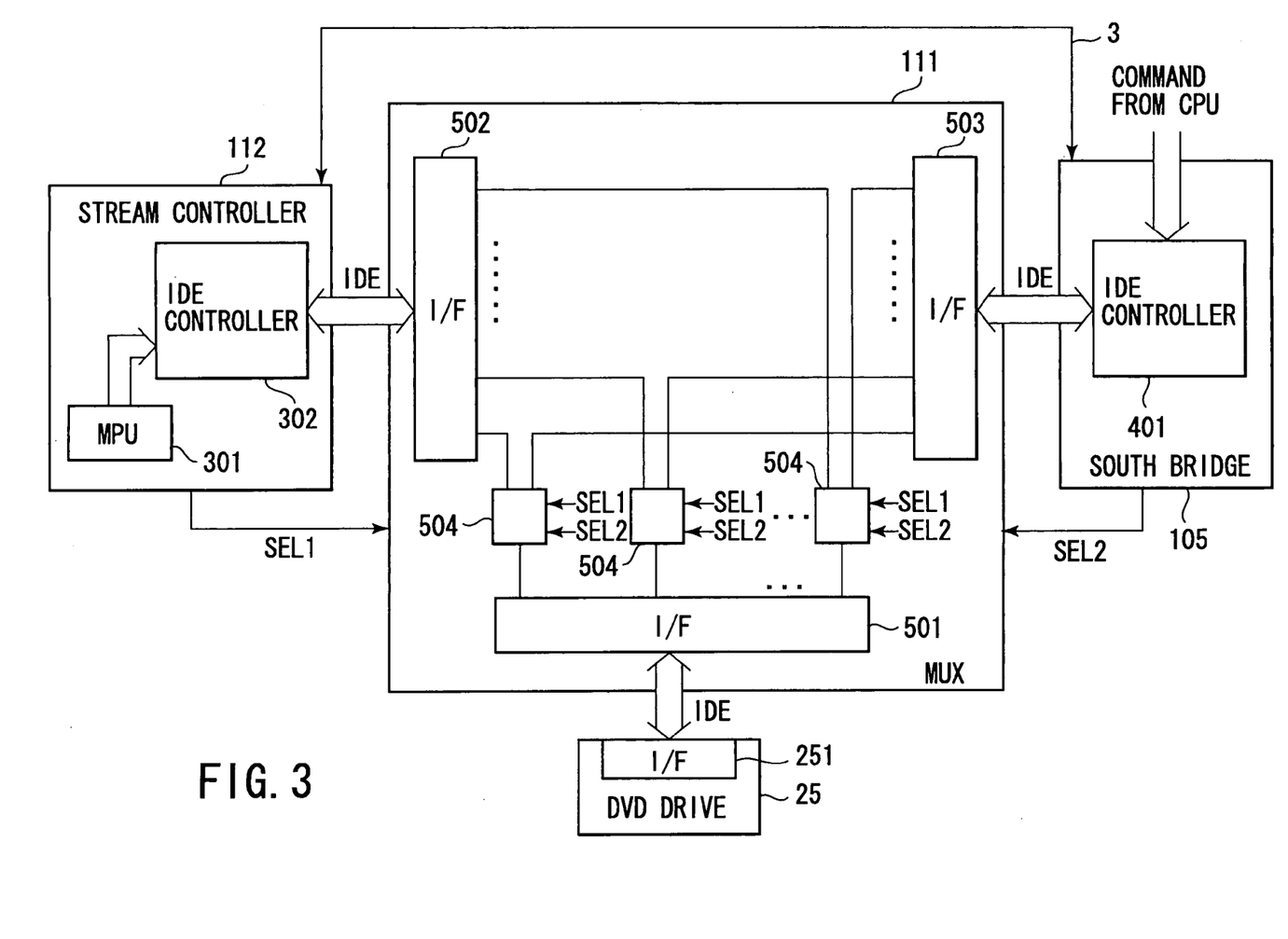
FIG. 3 is a block diagram showing an example of the structure of a multiplexer provided in the computer shown in FIG. 1.

The multiplexer 111, as shown in FIG. 3, includes first to third bus interface units 501, 502 and 503. The first bus interface unit 501 is connected to an IDE bus interface 251 of the DVD drive 25 via the IDE bus. The second bus interface unit 502 is connected to the stream controller 112 via the IDE bus. The third bus interface unit 503 is connected to the south bridge 105 via the IDE bus.

The multiplexer 111 further includes a plurality of selectors 504. The number of selectors 504 is equal to the number of signal lines defined in the IDE bus. The selectors 504 constitute a switch circuit that switches the destination of connection of the IDE bus interface 251 of DVD drive 25 between the stream controller 112 and south bridge 105.

Specifically, the selectors 504 select one of the second and third bus interface units 502 and 503 and electrically connect the selected bus interface unit to the first bus interface unit 501. The selection of the bus interface unit is effected by select signals SEL1 and SEL2.

The select signal SEL1 is a signal that is supplied from the stream controller 112 to the multiplexer 111, and it indicates that the stream controller 112 is to be selected, that is, the second bus interface unit 502 is to be selected. When the play button 26a is depressed, the stream controller 112 generates the select signal SEL1. When the stop button 26b is depressed, the stream controller 112 stops the generation of the select signal SEL1.

The select signal SEL2 is a signal that is supplied from the south bridge 105 to the multiplexer 111, and it indicates that the south bridge 105 is to be selected, that is, the third bus interface 503 is to be selected. When the computer is powered on, the south bridge 105 generates the select signal SEL2.

Upon receiving the select signal SEL1, the multiplexer 111 connects the second bus interface unit 502 to the first bus interface unit 501, in order to electrically connect the DVD drive 25 to the stream controller 112. On the other hand, upon receiving the select signal SEL2, the multiplexer 111 connects the third bus interface unit 503 to the first bus interface unit 501, in order to electrically connect the DVD drive 25 to the south bridge 105. It is possible to give priority to the select signal SEL2 over the select signal SEL1. In this case, if the select signal SEL2 is generated while the select signal SEL1 is being generated, the multiplexer 111 connects the third bus interface unit 503 to the first bus interface unit 501.

The stream controller 112 includes a processor (MPU) 301 and an IDE controller 302. Responding to a command from the processor (MPU) 301, the IDE controller 302 accesses the DVD drive 25 and reads data from the DVD drive 25.

The south bridge 105 includes an IDE controller 401. Responding to a command from the CPU 101, the IDE controller 401 accesses the DVD driver 25 and reads data from the DVD drive 25.

The stream controller 112 and south bridge 105 are connected to a serial bus 3 such as an $I^2C$ bus. The stream controller 112 and south bridge 105 can communicate with each other via the serial bus 3.

Figure 4:
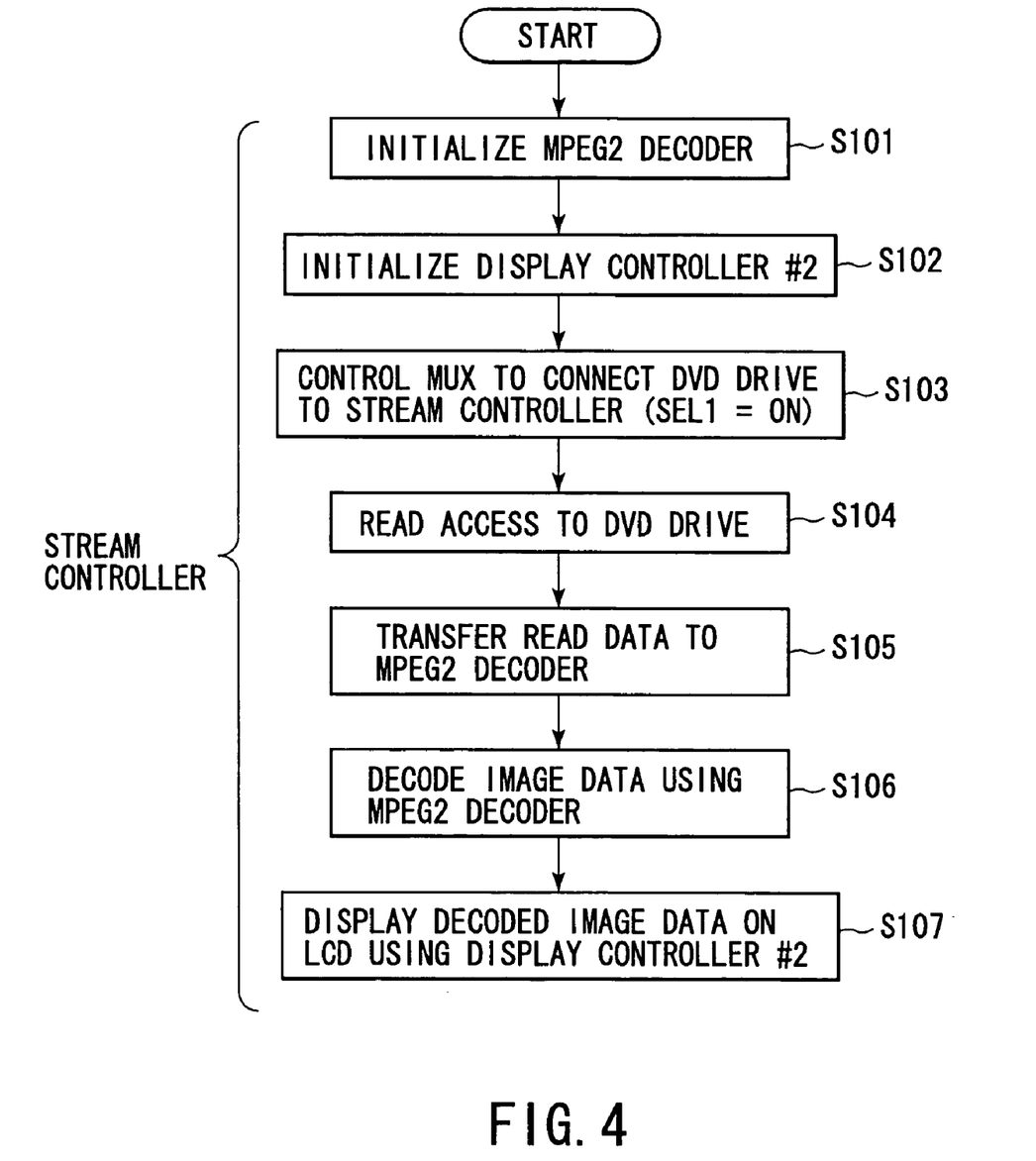
FIG. 4 is a flow chart illustrating an example of a process procedure executed by a stream controller provided in the computer shown in FIG. 1.

Referring now to a flow chart of FIG. 4, a description is given of the process executed by the processor 301 of the stream controller 112.

Assume that the user has operated the play button 26a of video control buttons 26 while the computer is in the power-off state.

Responding to the operation of the play button 26a, the power supply controller 109 supplies power VCC2 to the second system. The second system is thus activated. The processor 301 of stream controller 112 first executes a process for initializing the MPEG2 decoder 114 and second display controller 115 via the control bus 211 (steps S101 and S102). Then, the processor 301 supplies the select signal SEL1 to the multiplexer 111, thereby switching the destination of connection of the IDE bus interface 251 of DVD drive 25 to the stream controller 112 (step S103).

The processor 301 initializes the DVD drive 25 via the IDE controller 302, following which the processor 301 executes read access to the DVD drive 25 and receives data read out of the DVD drive 25 (step S104). In step S104, communication between the IDE controller 302 and DVD drive 25 is executed according to the procedure of the IDE standard. Thereby, image data stored on DVD media is read out of the DVD drive 25 via the IDE bus.

The processor 301 receives read data from the DVD drive 25 and transfers it to the MPEG2 decoder 114 (step S105). In step S105, the processor 301 executes a process for converting the read data from the DVD drive 25 to an MPEG2 program stream. The data read out of the DVD drive 25 is transferred from the processor 301 to the MPEG2 decoder 114 as the MPEG2 program stream. Thereafter, the processor 301 decodes the image data (MPEG2 program stream) using the MPEG2 decoder 114, and instructs the second display controller 115 to cause the LCD 121 to display the decoded image data (steps S106 and S107).

By the above-described processing, image data such as motion video can be displayed without the need to activate the operating system. If the user depresses the stop button 26b subsequently, the supply of the power VCC2 to the second system is stopped and the operation of the second system is halted.

Figure 5:
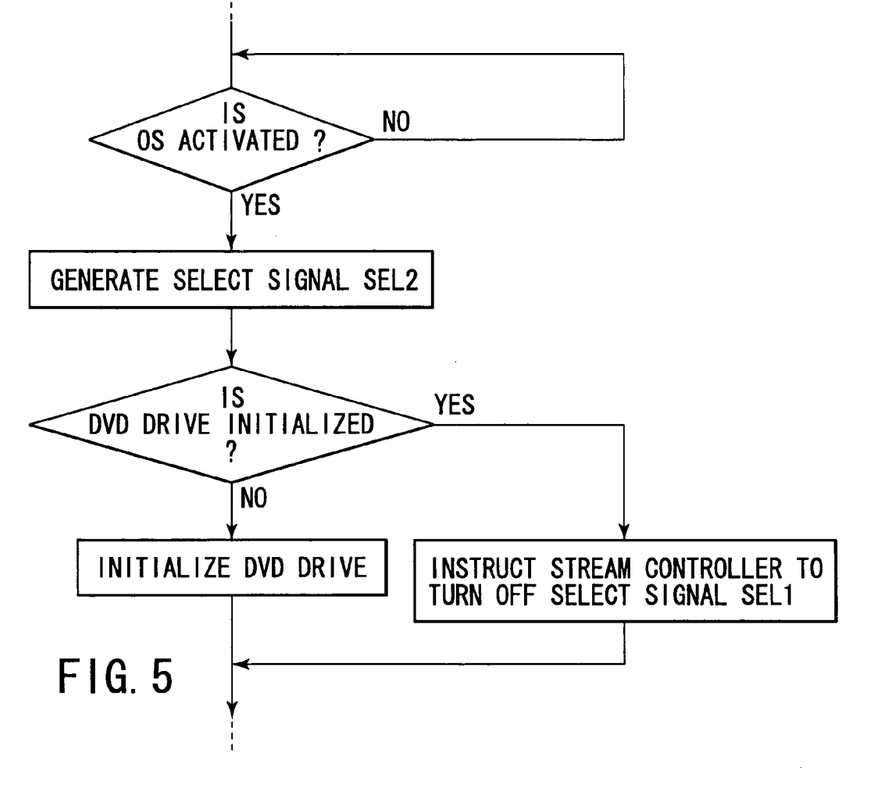

Next, the operation of the first system is described referring to a flow chart of FIG. 5.

When the user depresses the power button 24, the power supply controller 109 supplies power VCC1 to the first system. The bootstrap process for booting the operating system is started. If the operating system is bootstrapped (YES in step S201), the CPU 101 executes the following process under control of the operating system.

The CPU 101 supplies to the south bridge 105 a command for instructing generation of the select signal SEL2, and thus the select signal SEL2 is generated (step S202). Thereby, the multiplexer 111 connects the DVD drive 25 to the south bridge 105. The CPU 101 reads status data from the register in the DVD drive 25 and determines, on the basis of the value of the status data, whether the DVD drive 25 is already initialized (step S203).

If the DVD drive 25 is not initialized (NO in step S203), the CPU 101 initializes the DVD drive 25 (step S204). If the DVD drive 2 is already initialized (YES in step S203), the CPU 101 determines that the second system is in operation and issues to the stream controller 112 a command indicating that the select signal SEL2 should be turned off (step S205). This command is sent from the south bridge 105 to the stream controller 112 via the serial bus 3. Upon receiving the command, the stream controller 112 stops the generation of the select signal SEL1 and halts the access operation to the DVD drive 25.

Figure 6:
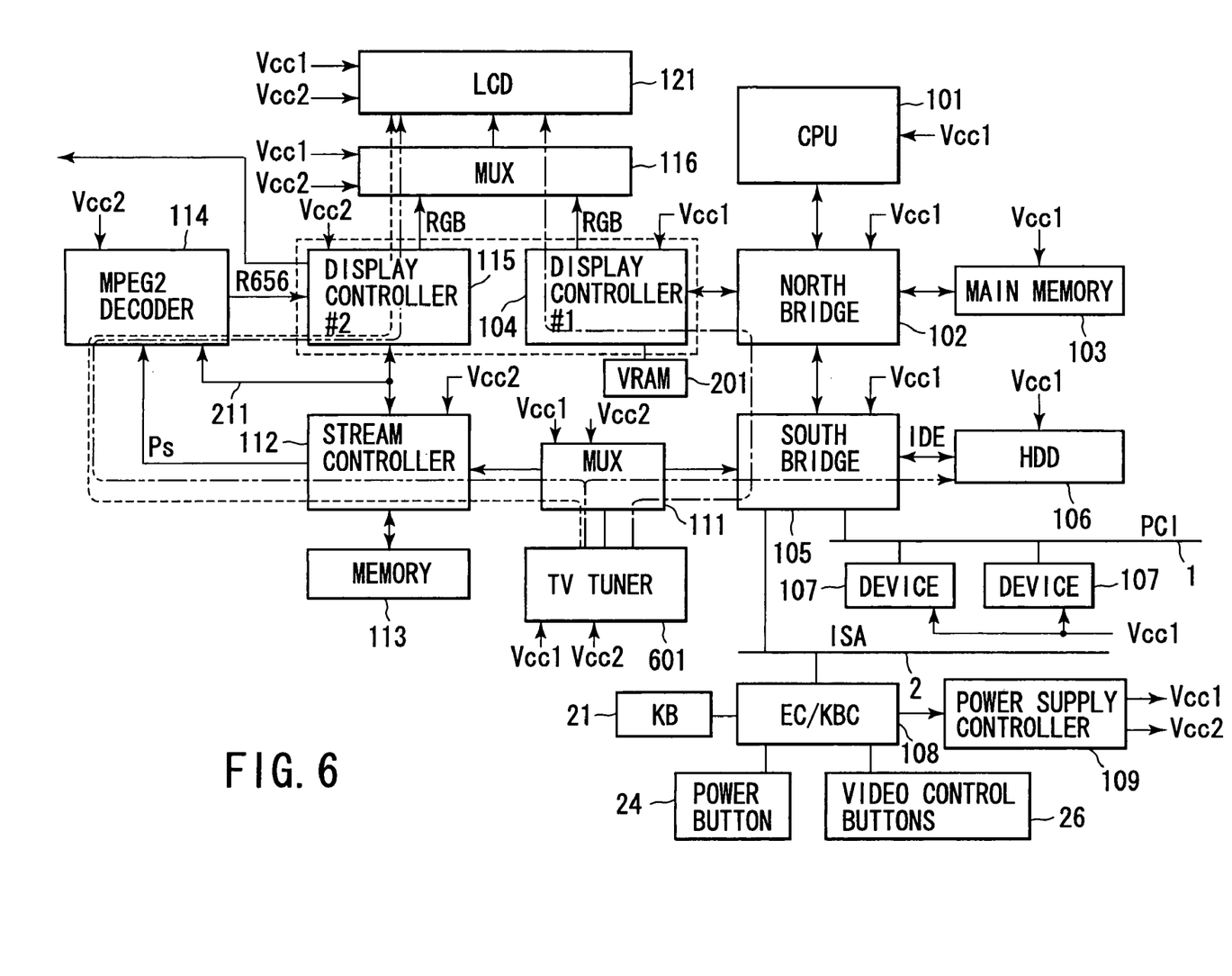
FIG. 6 is a block diagram showing a second example of the system configuration of the computer shown in FIG. 1.

FIG. 6 shows a second example of the system configuration of the computer.

The computer shown in FIG. 6 is configured such that a TV tuner 601, instead of DVD drive 25, is shared by the first and second systems. In the other respects, the configuration of FIG. 6 is the same as that of FIG. 2.

The TV tuner 601 is a peripheral device that outputs image data. The TV tuner 601 receives broadcast program data such as TV programs via a TV antenna and outputs the received broadcast program data. The TV tuner 601 is supplied with both the power supply VCC1 and power supply VCC2 as its operational power supply. Thereby, the TV tuner 601 can operate not only when the computer is powered on, but also when the play button 26a of the video control buttons 26 is operated.

The TV tuner 601 has a bus interface including a plurality of signal lines. The bus interface is connected to the multiplexer 111. Upon receiving the select signal SEL1, the multiplexer 111 connects the bus interface of the TV tuner 601 to the stream controller 112. On the other hand, upon receiving the select signal SEL2, the multiplexer 111 connects the bus interface of the TV tuner 601 to the south bridge 105.

In the structure shown in FIG. 6, when the first system is activated, broadcast program data received by the TV tuner 601 is displayed on the LCD 121 via the multiplexer 111, south bridge 105, north bridge 102 and first display controller 104, as indicated by a dot-and-dash line in FIG. 6. On the other hand, when the second system is activated, broadcast program data received by the TV tuner 601 is displayed on the LCD 121 via the multiplexer 111, stream controller 112, MPEG2 decoder 114 and second display controller 115, as indicated by a broken line in FIG. 6. In a case where the broadcast program data received by the TV tuner 601 is not an MPEG stream, the broadcast program data bypasses the MPEG2 decoder 114.

Besides, as indicated by a two-dot-and-dash line in FIG. 6, while broadcast data is being displayed on the LCD 121 by the second system, the broadcast data may be recorded on the HDD 106 in the first system. In this case, the multiplexer 111 simultaneously supplies the broadcast program data, which is received by the TV tuner 601, to the south bridge 105 and stream controller 112.

Figure 7:
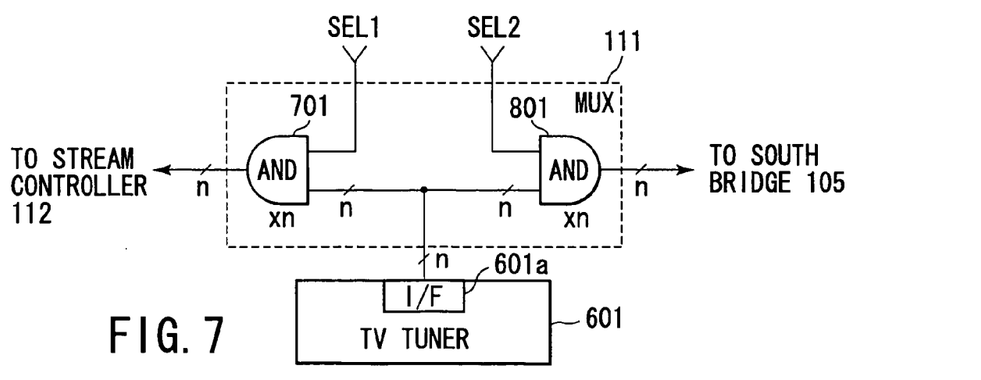
FIG. 7 is a block diagram showing an example of the structure of a multiplexer provided in the computer shown in FIG. 6.

FIG. 7 shows an example of the structure of the multiplexer 111 associated with the system shown in FIG. 6.

The TV tuner 601 has an interface 601a for outputting received broadcast program data. The interface 601a includes a plurality (n) of signal lines. The multiplexer 111 includes an n-number of 2-input AND gates 701 for connecting the interface 601a to the stream controller 112, and an n-number of 2-input AND gates 801 for connecting the interface 601a to the south bridge 105.

First inputs of the n-number of 2-input AND gates 701 are connected to the n-number of signal lines, respectively. Second inputs of the n-number of 2-input AND gates 701 are connected to the select signal SEL1. Similarly, first inputs of the n-number of 2-input AND gates 801 are connected to the n-number of signal lines, respectively. Second inputs of the n-number of 2-input AND gates 801 are connected to the select signal SEL2. The n-number of 2-input AND gates 701 are gate-controlled by the select signal SEL1, and the n-number of 2-input AND gates 801 are gate-controlled by the select signal SEL2. The multiplexer 111 operates in one of the following modes 1, 2 and 3.

Operation Mode 1

When the select signal SEL1 is generated and the select signal SEL2 is not generated, the multiplexer 111 connects the interface 601a of TV tuner 601 to the stream controller 112. Broadcast program data received by the TV tuner 601 is sent to the stream controller 112.

Operation Mode 2

When the select signal SEL2 is generated and the select signal SEL1 is not generated, the multiplexer 111 connects the interface 601a of TV tuner 601 to the south bridge 105. Broadcast program data received by the TV tuner 601 is sent to the south bridge 105.

Operation Mode 3

When both the select signal SEL1 and select signal SEL2 are generated, the multiplexer 111 connects the interface 601a of TV tuner 601 to the stream controller 112 and south bridge 105. Broadcast program data received by the TV tuner 601 is sent to the stream controller 112 and south bridge 105.

As has been described above, the computer of this embodiment comprises the first system including the CPU 101 that executes the operating system and the second system including the stream controller 112 that is the processor operable independently of the first system. When image data is to be displayed by the second system, the destination of connection of the peripheral device, such as DVD drive 25 or TV tuner 601, is switched by the multiplexer 111 from the first system to the second system. The first and second systems include the display controllers 104 and 115, respectively. Image data output from the peripheral device is sent to the display controller 115 provided in the second system. Thereby, image data such as motion video can be displayed without the need to activate the operating system.

The two display controllers 104 and 115, as mentioned above, may be realized as a single display control unit including a port for receiving data from the first system and a port for receiving data from the second system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a housing:
a peripheral device provided in the housing, the peripheral device having an interface and being capable of outputting image data via the interface;
a first system provided in the housing, the first system including a CPU capable of executing an operating system, a first display controller that causes a display device to display data written in a memory by the CPU, and a first controller that executes communication with the peripheral device via the interface, receives the image data output from the peripheral device, and transfers the image data to the CPU;
a second system operable independently of the first system, the second system including a second controller that executes communication with the peripheral device via the interface and receives the image data output from the peripheral device, the second system also including a second display controller that is coupled to the second controller, receives the image data sent from the second controller, and causes the display device to display the image data;
a switch device that switches a destination of connection of the interface of the peripheral device from the first controller to the second controller, in response to a select signal supplied from the second controller;
a power button that is provided on the housing and outputs a power-on signal indicating that the information processing apparatus is to be powered on;
an operation button that is provided on the housing and outputs a reproduction instruction signal instructing image reproduction; and
a power supply unit provided in the housing, the power supply unit supplying power to the first system, the peripheral device, and the switch device in response to the power-on signal, the power supply unit supplying power to the second system, the peripheral device, and the switch device in response to the reproduction instruction signal.

2. The information processing apparatus according to claim 1, wherein the second controller includes a processor that controls the peripheral device and the second display controller.

3. The information processing apparatus according to claim 1, wherein the second controller includes a processor that controls the peripheral device and the second display controller, and
the processor includes means for executing a process for initializing the peripheral device and the second display controller in response to the supply of power to the second system.

4. The information processing apparatus according to claim 1, wherein the image data includes compression-encoded data, and the second system further includes a decoder that decodes the image data received by the second controller.

5. The information processing apparatus according to claim 1, wherein the second system further includes means for converting the image data received by the second controller to a video signal that is to be output to an external TV receiver.

6. The information processing apparatus according to claim 1, wherein the interface of the peripheral device includes a plurality of signal lines, and the switch device includes a switch circuit that electrically connects the plurality of signal lines of the interface to one of the first controller and the second controller.

7. The information processing apparatus according to claim 1, wherein the peripheral device includes a drive unit that drives a storage medium.

8. The information processing apparatus according to claim 1, wherein the peripheral device includes a receiving device that receives broadcast program data.

* * * * *